United States Patent Office 3,095,784
Patented July 2, 1963

3,095,784
ELECTRO-HYDRAULIC CONTROL SERVO-MECHANISMS
Robert Sydney Colhoun, Lisburn, Northern Ireland, assignor to Short Brothers & Harland Limited, Belfast, Northern Ireland, a British company
Filed July 14, 1960, Ser. No. 42,782
Claims priority, application Great Britain July 28, 1959
9 Claims. (Cl. 91—1)

In electro-hydraulic control systems incorporating servo-motor mechanisms, it is customary to multiplicate the servo-motor mechanisms in order to provide the necessary degree of reliability and safety. When using multiplicated servo control systems, and especially in aerodyne control apparatus, it is desirable and often essential to detect a fault in any channel of the system, so that the pilot or controller may be made aware of the reduction in the standard of safety remaining in the system and thereby warned of the necessity for taking remedial action, or to indicate to him that the faulty channel has been isolated and is defective. The object of the present invention is to provide means for identifying a faulty channel in a multiplicated electro-hydraulic servo system.

According to the present invention there is provided an electro-hydraulic servo system comprising a common input control member and a common output member and at least three independent channels for the transmission of signals from the input control member to the output member, each channel comprising a motor adapted to be controlled by signals developed by movement of the input control member and coupled to operate a hydraulic servo valve controlling the supply of hydraulic fluid to a hydraulic servo motor mechanically coupled to drive the said common output member, means for comparing the position of the servo valve in each of the channels or the position of a member mechanically coupled thereto with the position of the hydraulic valve or mechanically coupled member in each of two of the other channels, and warning means responsive to a disparity between the valve or member positions to indicate the identity of a defective channel.

Preferably each channel includes an amplifier responsive to signals applied thereto from said input control member to generate output signals for operating said motor, and each channel is provided with a feed back loop between the servo valve or a member mechanically coupled thereto and the input of said amplifier.

Such an arrangement enables a high forward gain to be used on the amplifier/motor/valve combination and reduces the dead zone of the valve, whilst also tending to ensure that the several servo valves of the respective channels are operated uniformly in consistence with their common multiplicated inputs.

The servo valves will ordinarily be operated in synchronism, within the tolerance differences of their respective amplifier inputs, so that the additional servo valve feedback signals may be used as valve-position monitoring signals. These position signals may be applied to a plurality of relays, each of which is arranged to be energised by position signals from two channels, different relays being energised by different combinations of the position signals, taken two at a time, from the plurality of channels. Each relay is adapted to respond to an out-of-balance condition of the signals applied thereto and to operate associated switches. The warning means may then comprise a plurality of warning circuits equal to the number of channels and adapted to be operated by the relay switches, the arrangement being such that in response to a change in the position signal from any one of the channels the relays to which the signal is fed operate and cause simultaneous operation of their switches which are so arranged in the warning circuits as to close the warning circuit of only the said one of the channels.

In a preferred embodiment of this invention each warning circuit includes circuit holding means whereby upon closure of any one of the warning circuits the holding means associated therewith operates to hold the warning circuit closed even in the event of subsequent opening of the switches associated with the warning circuit.

One embodiment of the invention will now be described by way of example with reference to the accompanying drawings in which.

Figure 1:
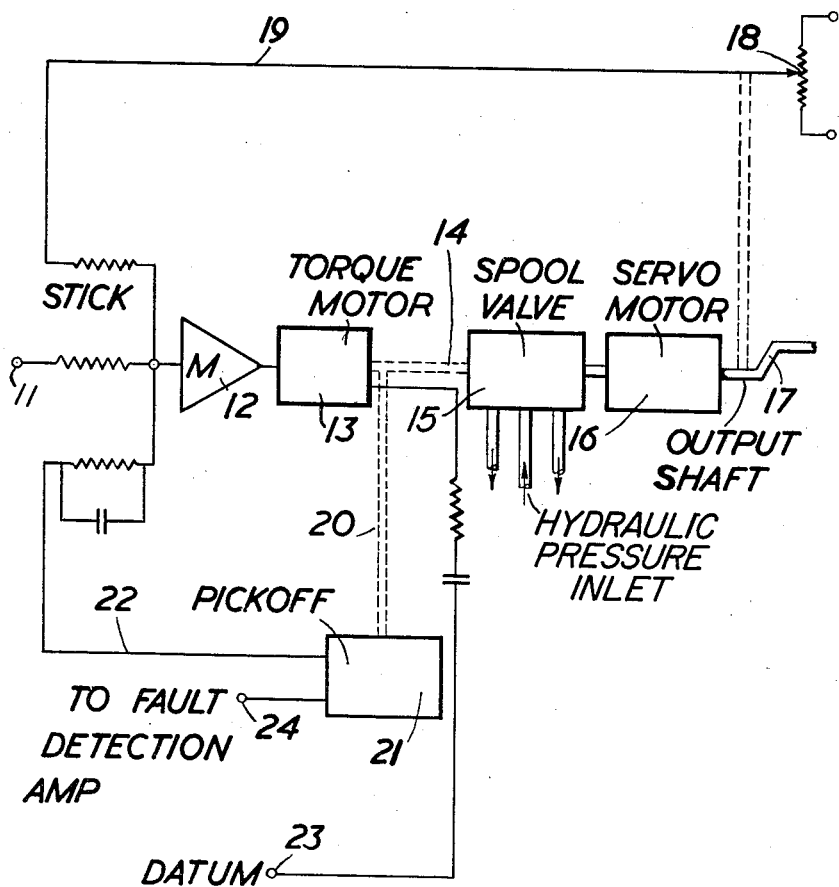
FIG. 1 is a block schematic diagram of a single channel of a triplicated electro-hydraulic servo system for controlling a control surface of an aircraft in response to movements of a pilot's control column.

Referring first to FIG. 1, means (not shown) are provided for generating an electrical signal which varies in amplitude in accordance with variations in the position of a pilot's control column (also not shown). These electrical signals are applied to input terminal 11 from which they are fed to a high-gain amplifier 12 where they are amplified and from which they are transmitted to control a torque motor 13 mechanically connected through a shaft 14 to operate a spool valve 15 of a hydraulic servo motor 16. An output shaft 17 of the servo motor 16 is mechanically coupled to mechanism for operating the aircraft control surface.

Following common practice, the output shaft 17 of the servo motor 16 is coupled to drive the wiper of a potentiometer 18 so as to generate a feed back signal which is fed back along a path 19 to the input of the amplifier 12. In addition, and in the preferred embodiment according to this invention, there is provided a feed back path between the output of the torque motor 13 and the input of the amplifier 12. This feed back path includes a mechanical connection 20 connected between the output shaft of the torque motor 13 and the input to a conventional pick off device 21, which is arranged to generate an electrical signal representative of the position of the output shaft of the torque motor 13. The latter signal is fed along a path 22 to the input of the amplifier 12. The torque motor 13 is set to respond in a predetermined manner to the input signals applied thereto by making an appropriate setting of a datum control voltage applied to an input terminal 23.

Figure 3:
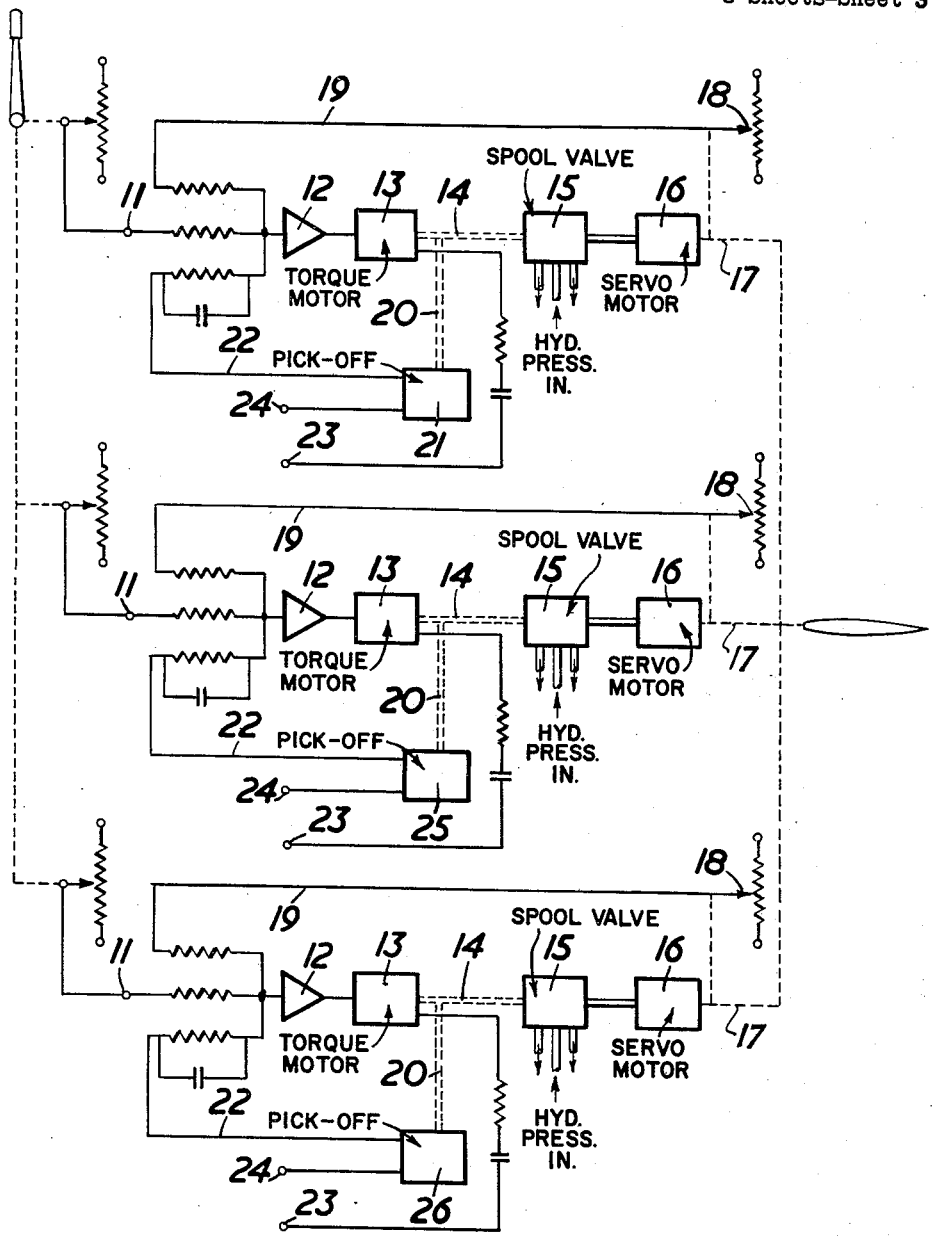
FIG. 3 is a block schematic diagram of the triplicated electro-hydraulic servo system.

The apparatus so far described with reference to FIG. 1 constitutes one channel of the triplicated electro hydraulic servo system comprising three such identical channels according to this invention. In the present embodiment three such identical channels are employed in parallel between the control column and the mechanism for operating the aircraft's control surface. The triplicated system is shown schematically in FIG. 3. The signals representative of the control column movement are applied in parallel to the input of amplifier 12 and the inputs of the corresponding amplifiers of the two other channels (not shown), and the output shaft 17 of servo motor 16 and the corresponding output shafts of the servo motors of the other two channels (not shown) are mechanically connected together and to the drive mechanism for the control surface.

As shown in FIG. 1, there is provided an additional electrical output from the pick off device 21, which also takes the form of an electrical signal representative of the position of the output shaft of the torque motor 13. This latter signal is applied to an output terminal 24 for use in the fault detection system now to be described.

Figure 2:
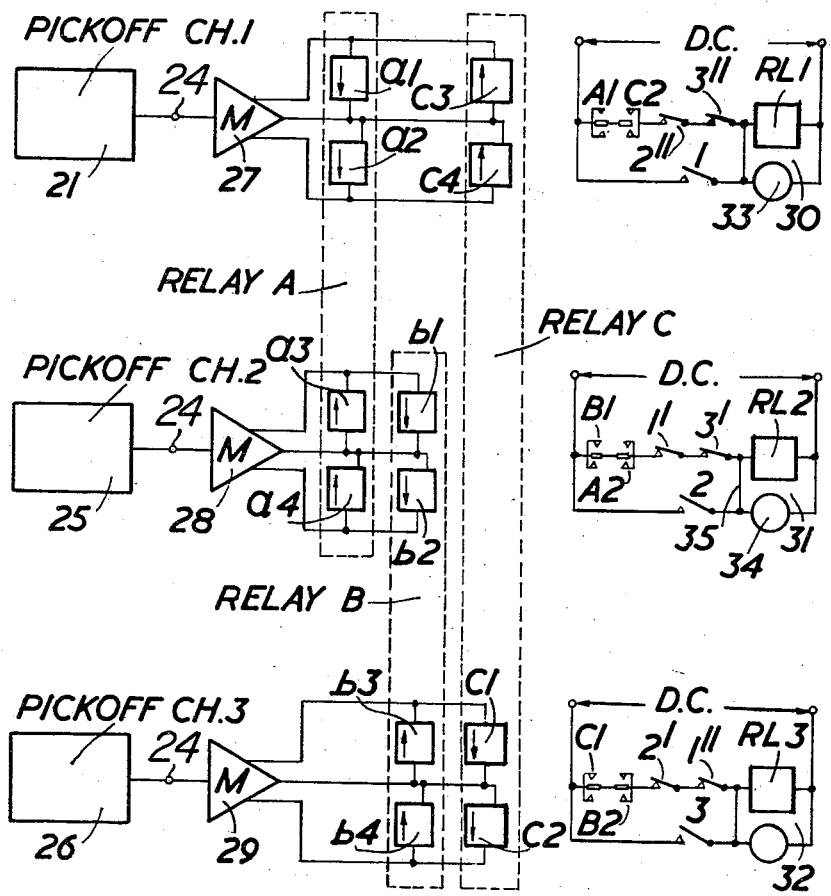
FIG. 2 is a block schematic diagram of a fault detection circuit for use with the system to be described with reference to FIG. 1.

Referring now to FIG. 2, the pick-off device 21 therein corresponds to the pick-off device 21 associated with the channel shown in FIGURE 1. Pick-off devices 25 and 26 are the corresponding pick-off devices of the other two channels (not shown). The output signals from pick-off devices 21, 25, 26 respectively are amplified in amplifiers 27, 28 and 29 which provide balanced outputs for the energisation of windings of three relays, A, B and C. The relay A is provided with two pairs of windings a1, a2 and a3, a4 and two sets of contacts A1 and A2. The relays B and C are identical to the relay A. The senses in which the windings of the relays are energised are represented in the drawing by arrows.

As will be seen, the contacts of the relays A, B and C are associated, in combinations taken two at a time, with three warning circuits 30, 31 and 32 which respectively serve to give a warning of defects or faults in the three channels of the system. The warning circuit 30 comprises a lamp 33 which is connected to a D.C. supply through contacts 1 of an electro-magnetic relay RL1, the winding of which is connected to the D.C. supply through contacts A1 and C2 of the relays A and C and two normally closed contacts. The relay RL1 has two further normally closed contacts 1' and 1" connected in series with the windings of the relays RL2 and RL3 of the other two warning circuits. In like manner the warning circuit 31 is provided with a lamp 34 connected to a D.C. supply through normally open contacts 2 of the electro magnetic relay RL2 which also has two further normally closed contacts 2' and 2".

In operation, in the event that, say, the signal from the pick off device 25 changes in amplitude in relation to the signals derived from the pick off devices 21 and 26, relays A and B operate causing their associated contacts to close. As will be seen, the only one of the warning circuits including sets of contacts from both these relays is the warning circruit 31. The winding of the relay RL2 thus becomes energised causing the closing of its contacts 2 and the energisation of the lamp 34. Its contacts 2' and 2" open and thus prevent subsequent energisation of the windings of the relays RL1 and RL3 in the other warning circuits. A connection such as 35 is made in each warning circuit so that the relay upon closure is held closed through contacts 2 even in the event that the contacts A2 B1 of the relays A and B subsequently open due, for example, to the fault in the channel being intermittent.

In the embodiment described, a visual indication is given to the pilot or controller that a channel has become defective. The warning means may in addition serve to isolate automatically the faulty channel by switching off the power supply to that channel and simultaneously declutching the defective servo-motor. This latter operation may be performed by means of a solenoid controlled valve (not shown) which, when operated, will isolate the hydraulic pressure supply to the defective servo-motor and interconnect the two ends of the cylinder so as to permit free by-pass of the hydraulic fluid.

What I claim as my invention and desire to secure by Letters Patent is:

1. An electro-hydraulic servo system comprising a common input control member, a common output member, at least three independent channels for the transmission of signals from the input control member to the output member, each channel comprising a first motor responsive to movement of the input control member, a hydraulic servo motor mechanically coupled to drive the common output member, means for supplying hydraulic fluid to the hydraulic servo motor, a hydraulic servo valve coupled to be operated by the said first motor, means for effectively comparing the position of the servo valve in each of the channels with the position of the servo valve in each of two other channels, and warning means responsive to a disparity between the valve positions to indicate the identity of a defective channel.

2. A system according to claim 1, wherein each channel includes an amplifier responsive to signals applied thereto from said input control member to generate output signals for operating said first motor, and wherein each channel is provided with a feed back loop for feeding back a signal representative of the position of the servo valve to the input of said amplifier.

3. A system according to claim 2, wherein each channel is provided with a feed back loop between the common output member and the input of the amplifier.

4. A system according to claim 1, wherein said means for comparing the positions of the valves comprises signal generating means, in respect of each channel, to generate a position signal which varies in accordance with the variations in the position of the valve, a plurality of relay devices, each of which includes switch means and is arranged to be energised by position signals from two channels, different relays being energised by different combinations of the position signals, taken two at a time, from the plurality of channels, and each of said relay devices responding to an out-of-balance condition of the position signals applied thereto to operate the switch means associated with the relay device, and wherein said warning means comprise a plurality of warning circuits equal to the number of channels, said warning circuits including said switch means in such arrangement that in response to a change in the position signal from any one of the channels relative to the position signals from the other channels the relay devices to which the changed position signal is fed operate and cause the simultaneous operation of their associated switch means which are so arranged in the warning circuits as to complete the warning circuit of only the said one of the channels.

5. A system according to claim 4 including circuit holding means for each warning circuit to operate upon closure of the warning circuit to hold the warning circuit closed even in the event of subsequent opening of the switch means associated with the warning circuit.

6. A system according to claim 5, wherein said holding means in respect of each warning circuit is so connected to the other warning circuits as to prevent their subsequent closure by their associated switch means.

7. A system according to claim 5, wherein each of said warning circuits comprises an alarm device for energisation by an electric supply, a switch connected to interrupt said supply and operated by an electro-magnetic relay, the winding of which is included in a series circuit with the associated switch means.

8. A system according to claim 4 comprising three channels and three warning circuits and wherein said plurality of relays comprise three electro-magnetic relays, each of which includes a pair of opposed windings, and wherein the switch means of each relay comprises two switches, the first of which is connected with one of the three warning circuits whilst the second of which is adapted to connect a power supply to the said first switch of one of the other relays, the windings of each relay being connected to be energised by position signals from the two channels and operate the switches of the relay when a state of electrical unbalance exists between them.

9. A servo system for controlling the movement of an output member in accordance with movements of an input control member comprising at least three independent parallel channels for the transmission of signals from said input member to said output member; each channel comprising a first motor responsive to movement of said input member, a fluid driven servo motor for mechanically driving said output member, and a servo valve coupled to be position operated by the respective said first motor to control the supply of fluid to the respective said servo motor; and means responsive to a predetermined disparity between the instant positions of said servo valves, including means for effectively comparing the position of the servo valve in each of the channels with the position of the servo valve in each of at least two other said channels simultaneously, for indicating the identity of a defective channel.

References Cited in the file of this patent

UNITED STATES PATENTS

| | | |
|---|---|---|
| 2,886,009 | Myers | May 12, 1959 |
| 2,894,491 | Hecht | July 14, 1959 |
| 3,015,313 | Faisander | Jan. 2, 1962 |
| 3,070,071 | Cooper | Dec. 25, 1962 |

FOREIGN PATENTS

| | | |
|---|---|---|
| 809,758 | Great Britain | Mar. 4, 1959 |